United States Patent
Prasad

(10) Patent No.: US 7,133,806 B2
(45) Date of Patent: Nov. 7, 2006

(54) METHOD AND APPARATUS FOR MEASUREMENT OF PROCESSOR-UTILIZATION

(75) Inventor: Vikas K. Prasad, Bangalore (IN)

(73) Assignee: Ittiam Systems (P) Ltd, Bangalore (IN)

( * ) Notice: Subject to any disclaimer, the term of this patent is extended or adjusted under 35 U.S.C. 154(b) by 0 days.

(21) Appl. No.: 11/127,359

(22) Filed: May 12, 2005

(65) Prior Publication Data

US 2005/0259592 A1 Nov. 24, 2005

Related U.S. Application Data

(60) Provisional application No. 60/570,718, filed on May 13, 2004.

(51) Int. Cl.
*G06F 15/00* (2006.01)
*G06F 17/40* (2006.01)

(52) U.S. Cl. ........................ 702/186; 702/187
(58) Field of Classification Search ................ 702/182, 702/186, 187, 188; 707/8, 10, 203; 370/252; 714/13
See application file for complete search history.

(56) References Cited

U.S. PATENT DOCUMENTS

| 5,016,005 A * | 5/1991 | Shaw et al. ............. 340/870.19 |
| 6,609,128 B1 * | 8/2003 | Underwood .................. 707/10 |
| 2004/0199813 A1 * | 10/2004 | Hillman et al. ................ 714/13 |

* cited by examiner

*Primary Examiner*—Bryan Bui
(74) *Attorney, Agent, or Firm*—Global IP Services, PLLC

(57) ABSTRACT

A method of managing a processing system that has at least one processor, uses the steps of: measuring MCPS (million cycles per second) utilization in the at least one processor; estimating a cycle count requirement for an algorithm on least one processor based on measured MCPS utilization; and, estimating an ability to run multiple applications on the at least one processor by assessing MCPS requirements and estimated cycle count requirement. Measurement of the MCPS utilization is preferably done by using the steps of: choosing a critical path in the processor, e.g., by taking hard real time requirements into consideration; measuring time taken for processing along said critical path; and, calculating MCPS requirements along said critical path using the measured time taken and a current processor clock speed. The inventive method has application in 802.11 MAC. Also described is a programmed storage medium to execute the described method.

23 Claims, 3 Drawing Sheets

☐ Start Time recording unit

○ End Time recording unit

---- Critical Path

☐ Start Time recording unit

◯ End Time recording unit

---- Critical Path

METHOD AND APPARATUS FOR MEASUREMENT OF PROCESSOR-UTILIZATION

RELATED APPLICATIONS

Benefit is claimed under 35 U.S.C. 119(e) to U.S. Provisional Application Ser. No. 60/570,718, entitled "A method and apparatus for path based MCPS utilization measurement" by Prasad K. Vikas, filed on May 13, 2004, which is herein incorporated in its entirety by reference for all purposes.

FIELD OF THE INVENTION

The present invention generally relates to efficient processor utilization, and more particularly to method and apparatus for measurement of processor utilization, e.g., in wireless networks.

BACKGROUND OF THE INVENTION

In the use of multiprocessors and parallel processors, especially during software implementation, it is known that one parameter that needs to be tracked is the MCPS (million cycles per second) estimation and requirement. Computational load is measured in MCPS, and during system and software design, it is helpful to compute MCPS requirements for software blocks. If the chip rate architecture is changed, the resource requirements including MCPS may also change. In a different scenario, in wireless communications, e.g., in wireless networks, the resource and MCPS requirements are dependent, among other things, on the number of antennas and other devices used in the system. If the spread factor for certain users decreases to accommodate higher data rates, the system resource requirements increase. One bottleneck in how many data rate users a system can handle is the symbol rate MCPS requirement. For example, four data users at 64 Kbps (spread factor 16) might require the same amount of symbol rate processing as 32 voice users. Background information on profiling techniques is available in literature. Some profiler information is available in the University of California computer science Technical Report 1996-13, dated May 2, 1996, entitled Design, Implementation, and Analysis of a Split-C Profiler, by Bjoern Haake. Background information about 'measuring process utilization levels' may be had from the publication dated Jul. 13, 2004, in Embedded Systems Programming, by Michael J Trader, entitled "How to calculate CPU utilization".

The basic service set (BSS) IEEE WLAN (wireless local area network) is comprised of an access point (AP) and a plurality of stations. The AP connects its stations with the infrastructure. The basic 802.11 MAC (medium access control) protocol is the DCF (distributed coordination function) that works as a listen-before-talk scheme, based on CSMA (carrier sense multiple access) approach. As known, in WLAN, if two stations detect a channel as being free at the same time, and both have a packet to transmit, a collision occurs, and, this situation is addressed by a collision avoidance (CA) system. As part of a CA system, a station keeps sensing the channel for an additional length of time after detecting the channel as being idle, for a minimum duration called DCF inter-frame space (DIFS). Each station maintains a so called back off count which may be a random number, and a contention window (CW) which are used to determine the number of slot times a station has to wait before transmission. To support time-bound services, the 802.11 standard defines PCF (point coordination function) to let stations have priority access to the wireless medium coordinated by a station called PC (point coordinator). In 802.11, to allow an immediate response, an ACK (acknowledgment) is transmitted following a directed received information packet, after a short inter-frame space (SIFS). In other words, acknowledgements are generated after successfully receiving a directed frame and obtaining channel access using a SIFS, where SIFS<DIFS.

In systems that need the use of computing and processing, measurement of the utilization of the total processor clock cycles for an algorithm or an application has usually been done in the past by computing a total number of idle cycles for the period of observation. It is also possible to observe the PC (program counter) position at regular intervals to compute statistically the utilization of the clock cycles per function. Such approaches sometimes do not enable an efficient use of resources and may not offer sufficient flexibility in the system.

SUMMARY OF THE INVENTION

One embodiment of the invention resides in a method for measuring MCPS (million cycles per second) utilization in a processor, comprising: choosing a critical path in an algorithm, for e.g., by taking hard real time requirements into consideration; measuring time taken for processing along said critical path; and, calculating MCPS requirements along said critical path using said measured time taken and a current processor clock speed. A second embodiment of the invention resides in a method of managing a processing system that has at least one processor, comprising: measuring MCPS (million cycles per second) utilization in said at least one processor; estimating a cycle count requirement for said at least one processor based on measured MCPS utilization; and, estimating an ability to run multiple applications on said at least one processor by assessing MCPS requirements and estimated cycle count requirement. Yet another embodiment resides in a method for measuring MCPS (million cycles per second) utilization in a processor in an IEEE 802.11-MAC implementation, comprising: choosing a critical path in said processor by taking hard real time requirements into consideration; measuring time taken for processing along said critical path; and, calculating MCPS requirements along said critical path using said measured time taken and a current processor clock speed.

It is to be understood that the present invention is applicable, without limitation, to any scenario where measurement of the MCPS utilization is sought and used in managing system resources. Modifications and variations in the method steps of the inventive method of measuring the MCPS utilization are possible without departing from the thrust of the inventive method and are within the ambit of the present invention. It is also to be understood that acronyms used in the claims should generally be understood as explained in the text unless otherwise explained.

BRIEF DESCRIPTION OF THE DRAWING

Embodiments of the invention will be described hereinafter, by way of example only and not any limitation, with reference to the accompanying drawing wherein.

DETAILED DESCRIPTION OF EMBODIMENTS

MCPS utilization is a key parameter of interest as it may be used to choose a processor with optimal clock speed or to determine the spare cycles on the processor for other applications. Described herein below are examples of a time-based method to measure the clock cycles utilized along representative critical paths. Expediently, memory access times and latencies due to external events are also considered which gives the designer an added input regarding the effective MCPS requirement. As an example of how the above technique can be used, its implementation in IEEE 802.11-MAC is also described below.

Figure 1:
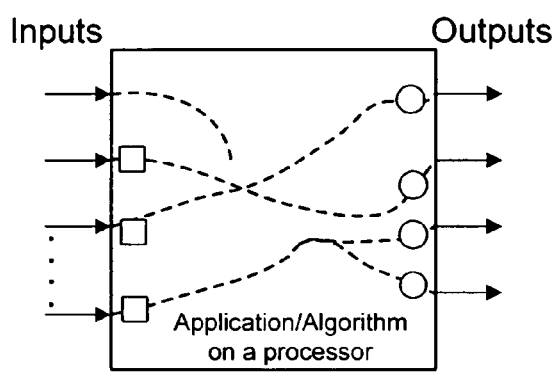
FIG. 1 illustrates MCPS measurement with time-recording units/stubs within the system.
Figure 2:
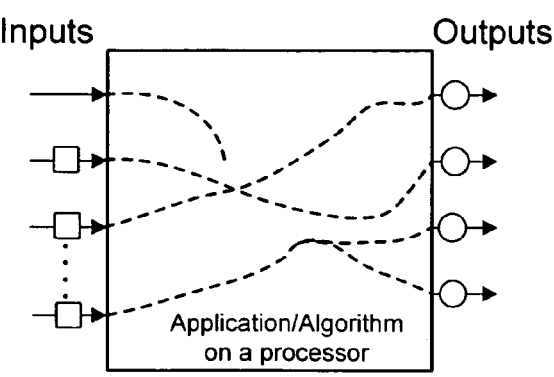
FIG. 2 illustrates MCPS measurement with time-recording units/stubs outside the system.
Figure 3:
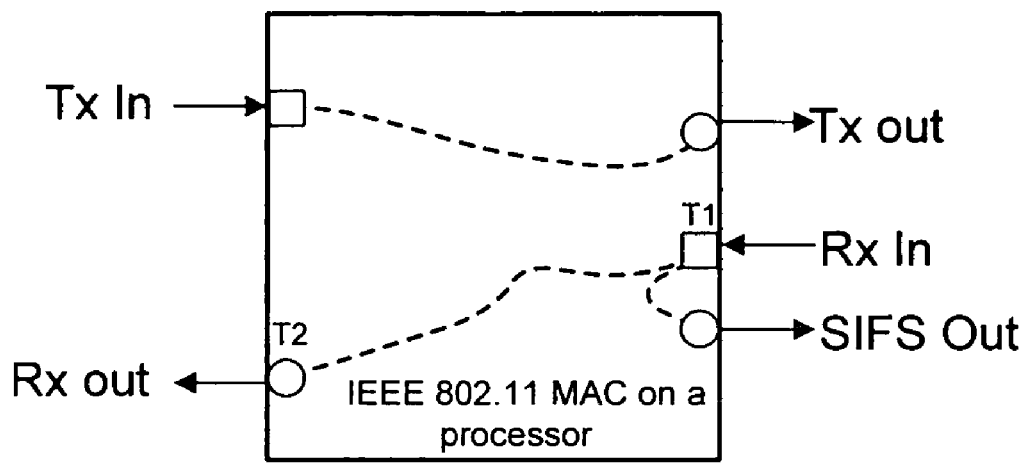
FIG. 3 illustrates MCPS measurement set up for IEEE 802.11 MAC.

The following aspects are noted in the context of the described embodiments:
1. Profiling techniques discussed in available literature generally do not consider the latencies and memory access times. Further, in known systems, emphasis is not given to the MCPS requirements of the algorithm along critical paths for hard real time considerations.
2. MCPS utilization is a performance measure that can be used to
   Estimate the current peak/average cycle count requirement.
   Choose a minimum MIPS rated processor for the application/algorithm.
   Estimate the ability to run multiple applications on a processor.
   Deciding partition criteria (usually software on processor Vs hardware).
3. The method described below requires as a first step for the designer to choose the critical path (e.g., with hard real time requirements) and measure the time taken to process along that path.
4. After the paths are chosen, stubs are used to measure the time taken along these paths. FIGS. 1 and 2 illustrate two of the possible exemplary arrangements for MCPS measurement indicating the location of the critical paths and the time-recording units. The time-recording units are labeled 'start-time recording unit' and 'end-time recording unit'. FIG. 1 shows the inputs and outputs for events relating to an application or algorithm in a processor, associated with corresponding start time recording units and the end time recording units. Likewise, FIG. 2 also illustrates inputs and outputs, critical paths, start time and end time recording units, similar to FIG. 1. However, as shown, in FIG. 1, the time recording units are pictorially shown to be within the system under measurement, whereas in FIG. 2, time recording units are pictorially shown to be outside the system under measurement. Some time recording units can be inside, and some outside.
5. The MCPS requirement along a critical path is calculated using the knowledge of time taken along the path and the current processor clock speed.
6. FIG. 3 shows an exemplary MCPS measurement set up for IEEE 802.11 MAC. As illustrated, in the IEEE 802.11 MAC implementation, at least two of the important defining factors for determining the required processing speed are SIFS time response and packet processing delay. As shown, the time recording units are located along Tx (transmission) path, Rx (receiver) path and SIFS response path. The peak MCPS requirement along these paths gives the total MCPS requirement. This includes the memory access times and latencies (interrupt and task switching if any). It is conceivable that setups are arranged in such a way that each of these paths is characterized independently. However, if the setups are characterized simultaneously, the paths may be overlaid and may give the worst case MCPS requirement along any path that can be a useful metric to determine the overall MCPS requirement. By the use of the foregoing technique, 802.11 a/b/g characterizations may be done to result in being able to choose a minimum MIPS rated processor for a given application, and for estimating the ability to run multiple applications on a processor, as well as decide partition criteria.
7. An apparatus that may be used to measure the MCPS requirement is patterned after FIG. 3. Details of the required components and their interaction will be intelligible to those who are skilled in the art.
8. The constants used in the set up of FIG. 3 are:
   N=Number of packets received
   T=Time taken to receive N packets (µs)
   S=Processor clock duration (µs/cycle)
9. Peak or average-receive MCPS computation is explained below and similar formulae are applicable for any other paths.
   Average time to process a received packet $$T_{avg} = \frac{\sum_{RxPkts}(T2-T1)}{N} \mu s/packet$$

Peak time is calculated in a similar way $T_{peak} = \max(T2-T1)$ µs/packet

Average number of cycles required to process one packet $$R_{pc} = \frac{T_{avg}}{S} \text{Cycles/packet(Use } T_{peak} \text{ if peak } MCPS \text{ is required)}$$

Packet arrival rate $$R_{pps} = \frac{N}{T} \times 10^6 \text{ Packets/second}$$

Receive path MCPS utilization $R_{mcps} = (R_{pc} \times R_{pps}) \times 10^{-6} MCPS$ Computations and required calculations for the MCPS utilization measurements as explained above may be made by using any suitable available computing platform. Various embodiments of the present subject matter can be implemented in software, which may be run in the environment shown in FIG. 4 or in any other suitable computing environment. It is noted that the embodiments of the present subject matter are capable of implementation in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 4:
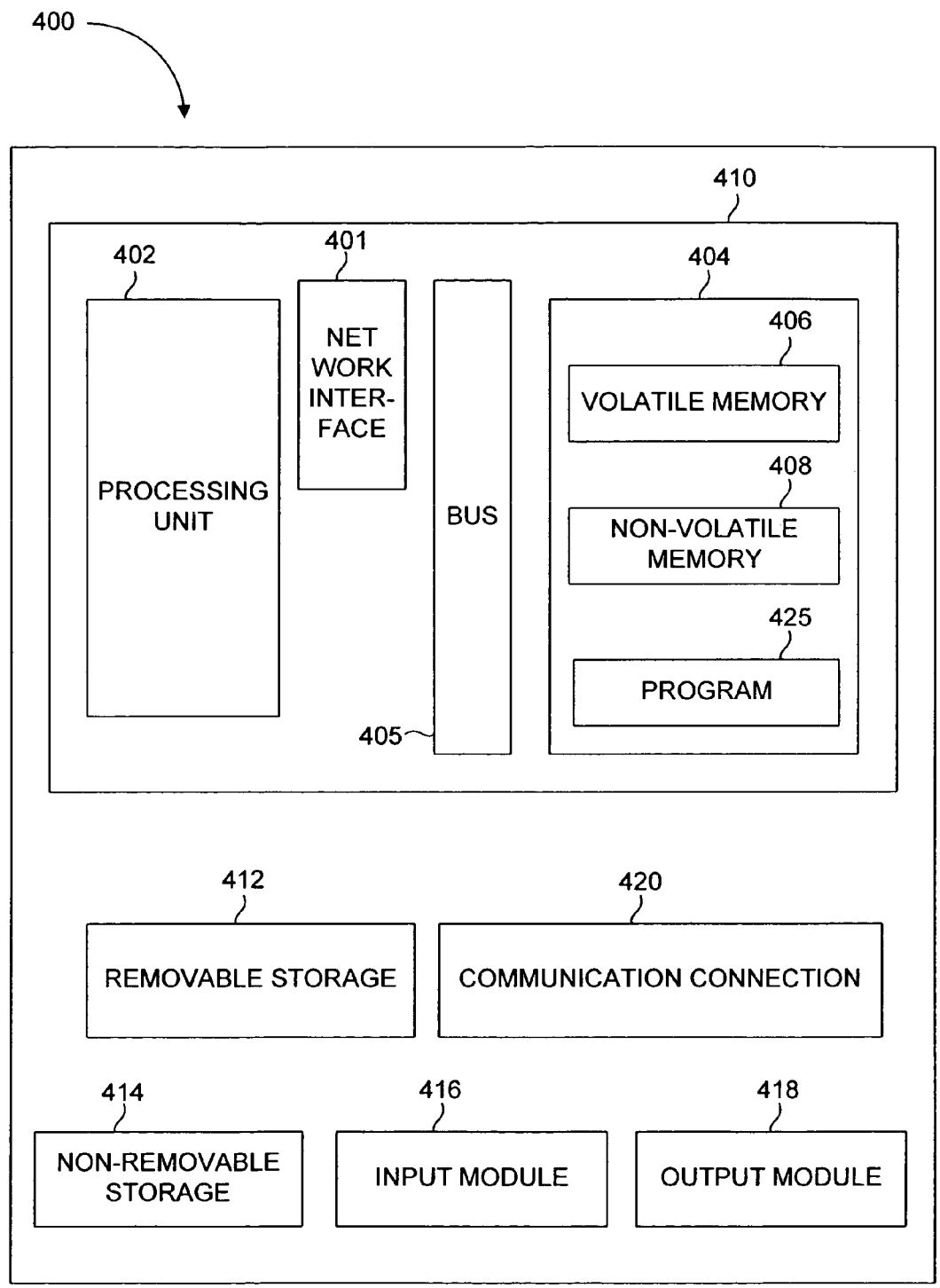
FIG. 4 is a block diagram of a typical computing system that may be used in implementing the MCPS measurement approach in the invention.

FIG. 4 shows an example of a suitable computing system environment for implementing embodiments of the present subject matter. FIG. 4 and the following discussion are intended to provide a brief, general description of a suitable computing environment in which certain embodiments of the inventive concepts contained herein may be implemented.

With reference to FIG. 4, a general computing device in the form of a computer 410 may include a processing unit 402, memory 404, removable storage 412, and non-removable storage 414. Computer 410 additionally includes a bus 405 and a network interface (NI) 401. Computer 410 may include or have access to a computing environment that includes one or more user input devices 416, one or more output modules or devices 418, and one or more communication connections 420 such as a network interface card or a USB connection. The one or more user input devices 416 can be a touch screen and a stylus and the like. The one or more output devices 418 can be a display device of computer, computer monitor, TV screen, plasma display, LCD display, display on a touch screen, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 412 and non-removable storage 414. Computer memory-elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a computer program 425 may include machine-readable instructions capable of making MCPS utilization measurements according to the teachings of the described embodiments of the present subject matter. In one embodiment, the computer program 425 may be included on a CD-ROM and loaded from the CD-ROM to a hard drive in non-volatile memory 408. The machine-readable instructions cause the computer 410 to decode according to the various embodiments of the present subject matter.

The foregoing is the description of exemplary implementations of the method and apparatus for path-based MCPS utilization measurements with a view to obtaining more efficient management of system resources in a computing environment. It is to be noted that the description hereinabove is intended to be illustrative, and not restrictive.

The various embodiments of the MCPS utilization measurement described herein are applicable generally to any communication system, and the embodiments described herein are in no way intended to limit the applicability of the invention. In addition, the techniques of the various exemplary embodiments are useful in the design of any hardware implementations of software, firmware, and algorithms in the context of MCPS measurement in general.

Many other embodiments will be apparent to those skilled in the art. The scope of this invention should therefore be determined by the appended claims as supported by the text, along with the full scope of equivalents to which such claims are entitled.

The invention claimed is:

1. A method for measuring MCPS (million cycles per second) utilization in a processor, comprising the steps of:
choosing a critical path in said processor by taking hard real time requirements into consideration;
measuring time taken for processing along said critical path using time recording units;
calculating MCPS requirements along said critical path using said measured and recorded time taken and a current processor clock speed; and,
using the calculated MCPS requirements for obtaining a match between the processor and one or more applications.

2. The method as in claim 1, wherein said step of measuring time taken is done by using time-recording stubs to measure processing time along said critical path and other paths, and using the processor clock speed.

3. The method as in claim 2, wherein said time recording stubs are within a system under measurement, said system including said processor.

4. The method as in claim 2, wherein said time recording stubs are outside a system under measurement, said system including said processor.

5. The method as in claim 1, including the step of considering memory access time for calculating the MCPS requirements, the method including the step of estimating the processor's ability to run multiple applications.

6. A method of managing a processing system that has at least one processor, comprising:
   measuring MCPS (million cycles per second) utilization in said at least one processor using time recording units;
   estimating a cycle count requirement for said at least one processor based on measured MCPS utilization; and,
   deciding an ability to run multiple applications on said at least one processor by assessing MCPS requirements and estimated cycle count requirement.

7. The method of managing as in claim 6, including the step of deciding partition criteria as to utilization options of said at least one processor and predetermined hardware for given applications.

8. The method of managing as in claim 6, wherein the processing system includes a plurality of processors, the method including the step of choosing a minimum MIPS (millions of instructions per second) rated processor for a given application/algorithm.

9. The method of managing as in claim 6, wherein the processing system includes a plurality of processors, the method including the step of choosing a processor with optimal clock speed for a given application/algorithm.

10. The method of managing as in claim 6, including the step of considering memory access times and latencies due to external events for measuring the MCPS utilization.

11. The method of managing as in claim 6, wherein the step of measuring MCPS utilization comprises the steps of:
   choosing a critical path in said processor by taking hard real time requirements into consideration;
   measuring time taken for processing along said critical path; and,
   calculating MCPS requirements along said critical path using said measured time taken and a current processor clock speed.

12. The method of managing as in claim 6, wherein said step of measuring time taken is done by using time-recording stubs to measure processing time along said critical path and other paths, and using the processor clock speed.

13. The method of managing as in claim 6, wherein said time recording stubs are within a system under measurement, said system including said processor.

14. The method of managing as in claim 6, wherein said time recording stubs are outside a system under measurement, said system including said processor.

15. The method of managing as in claim 6, including the step of considering memory access time for calculating the MCPS requirements, the method including the step of estimating the processor's ability to run multiple applications.

16. The method as in claim 1, implemented in 802.11-MAC scenario.

17. The method of managing as in claim 6, implemented in 802.11-MAC scenario.

18. A method for measuring MCPS (million cycles per second) utilization in a processor in an IEEE 802.11-MAC implementation, comprising:
   choosing a critical path in said processor by taking hard real time requirements into consideration;
   measuring time taken for processing along said critical path using time recording units;
   calculating MCPS requirements along said critical path using said measured and recorded time taken and a current processor clock speed; and,
   using the calculated MCPS requirements for obtaining a match between the processor and one or more applications.

19. The method as in claim 18, where said step of measuring time taken is done by using time recording units for critical packet transmission path, packet receiver path, and a short inter-frame space (SIFS) path.

20. The method as in claim 19, wherein said time recording units are within a system under measurement, said system including said processor.

21. The method as in claim 20, wherein a receive path MCPS utilization is given by:

$$R_{mcps} = (R_{pc} \times R_{pps}) \times 10^{-6} \ MCPS, \text{ where,}$$

$$R_{pc} = \frac{T_{avg}}{S} \text{Cycles/packet(Use } T_{peak} \text{ if peak } MCPS \text{ is required),}$$

and $$R_{pps} = \frac{N}{T} \times 10^6 \text{ Packets/second, where,}$$

$$T_{avg} = \frac{\sum_{RxPkts}(T2 - T1)}{N} \mu s/\text{packet,}$$

and $$T_{peak} = \max(T2 - T1)\mu s/\text{packet, where,}$$

T=time taken in microseconds to receive N packets,
S=processor clock duration in microseconds/cycle, and,
N=number of packets received.

22. A computer readable medium encoded with data/instruction which when executed by a computing platform, results in execution of a method comprising:
   measuring MCPS (million cycles per second) utilization in said at least one processor using time recording units;
   estimating a cycle count requirement for said at least one processor based on measured MCPS utilization; and,
   deciding an ability to run multiple applications on said at least one processor by assessing MCPS requirements and estimated cycle count requirement.

23. The computer readable medium as in claim 22, wherein the step of measuring MCPS utilization comprises the steps of:
   choosing a critical path in said processor with hard real time requirements;
   measuring time taken for processing along said critical path; and,
   calculating MCPS requirements along said critical path using said measured time taken and a current processor clock speed.

* * * * *